(12) United States Patent
Osawa

(10) Patent No.: US 8,740,632 B2
(45) Date of Patent: Jun. 3, 2014

(54) VEHICLE-SIDE CONNECTOR

(75) Inventor: Kiyoshi Osawa, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 108 days.

(21) Appl. No.: 13/429,892

(22) Filed: Mar. 26, 2012

(65) Prior Publication Data
US 2012/0258635 A1 Oct. 11, 2012

(30) Foreign Application Priority Data

Apr. 5, 2011 (JP) ................................ 2011-083480

(51) Int. Cl.
H01R 12/00 (2006.01)

(52) U.S. Cl.
USPC ........................................................ 439/76.2

(58) Field of Classification Search
USPC ......... 439/76.1, 76.2, 34, 475, 573, 557, 660; 361/752; 174/50.52
See application file for complete search history.

(56) References Cited

U.S. PATENT DOCUMENTS

| | | | | |
|---|---|---|---|---|
| 1,697,814 A | * | 1/1929 | Forbes | 16/2.1 |
| 5,816,839 A | * | 10/1998 | Muta | 439/342 |
| 5,861,577 A | * | 1/1999 | Tamura et al. | 174/50.56 |
| 5,947,766 A | * | 9/1999 | Tsuji et al. | 439/559 |
| 6,547,599 B2 | * | 4/2003 | Kinsey et al. | 439/620.26 |
| 7,029,219 B2 | * | 4/2006 | Kovac | 411/353 |
| 7,255,597 B2 | * | 8/2007 | Nakamura et al. | 439/573 |
| 7,291,024 B2 | * | 11/2007 | Kiyota et al. | 439/76.2 |
| 7,510,404 B2 | * | 3/2009 | Koyama | 439/76.1 |
| 7,563,112 B2 | * | 7/2009 | Honda | 439/79 |
| 7,643,271 B2 | * | 1/2010 | Phillips et al. | 361/643 |
| 7,827,847 B2 | * | 11/2010 | Oishi et al. | 73/23.2 |
| 7,971,833 B2 | * | 7/2011 | Utaki et al. | 248/49 |
| 8,269,103 B2 | * | 9/2012 | Kiyota | 174/50 |
| 8,338,720 B2 | * | 12/2012 | Burgi et al. | 174/541 |

FOREIGN PATENT DOCUMENTS

| | | |
|---|---|---|
| CH | 698969 | 12/2009 |
| EP | 0844698 | 5/1998 |
| JP | 2010-166756 | 7/2010 |

OTHER PUBLICATIONS

European Search Report, Jul. 11, 2012.
Rosato D V et al, "Injection Molding Handbook, Design Features that Influence Performance", Injection Molding Handbook: The Complete Molding Operation; Technology, Performance Economics, Jan. 1, 1995, pp. 623-626, Chapman & Hall, New York.
Johannaber F et al: "Fertigungsgerechte Formteilgestaltung" Handbuch Spritzgiessen, Nov. 13, 2001, pp. 1099-1103, Hanser, Munchen, Wien.

* cited by examiner

*Primary Examiner* — Alexander Gilman
(74) *Attorney, Agent, or Firm* — Gerald E. Hespos; Michael J. Porco; Matthew T. Hespos

(57) ABSTRACT

A vehicle-side connector (10) to be connected to a charging connector in charging a battery of a vehicle includes a receptacle (33) which is made of synthetic resin and to be connected to the charging connector, a mounting piece (31) which is made of synthetic resin and integrally provided to the outer peripheral surface of the receptacle (33), collars (34) each including a flange (34A) engageable with the mounting piece (31) in a connecting direction, and reinforcing portions (41) integrally connected to the mounting piece (31) and the receptacle (33).

13 Claims, 5 Drawing Sheets

VEHICLE-SIDE CONNECTOR

BACKGROUND OF THE INVENTION

1. Field of the Invention

The invention relates to a vehicle-side connector to be connected to a charging connector during or for charging.

2. Description of the Related Art

Japanese Unexamined Patent Publication No. 2010-166756 discloses a vehicle-side connector to be mounted on a vehicle body of a hybrid vehicle or an electric vehicle. The vehicle-side connector includes a connecting portion made of synthetic resin and to be connected to a charging connector. A mounting piece made of synthetic resin projects integrally from the outer surface of the connecting portion and collars made of metal are press-fit to this mounting piece. The vehicle-side connector is mounted and fixed to the vehicle body by inserting fixing bolts into the collars and tightening them into the vehicle body.

A seal, such as a surface seal, is mounted between the mounting piece and the vehicle to prevent the water from entering the vehicle interior through a clearance between the mounting piece and the vehicle. However, sinks are formed on the surface of a thick mounting piece when the mounting piece is molded. The sinks reduce adhesion of the seal to the mounting piece. Thus, the mounting piece generally is set to be thin. However, a thin mounting piece is weaker and may be deformed resiliently. Thus, clearances may be formed in close-contact parts of the mounting piece and the collars. Accordingly, the mounting piece may be detached from the collars and from the vehicle, if the charging connector connected to the connecting portion is pulled strongly in a direction different from a proper pulling direction and a force acts on the connecting portion in the direction crossing the proper pulling direction. Studies have considered increasing a locking force between the collars and the mounting piece by providing flanges on end portions of the collars and engaging the flanges and the mounting piece in a connecting direction.

A pulling force may cause stress to act on a boundary between the connecting portion and the mounting piece even though a locking force between the collars and the mounting piece is increased. As a result, the boundary part between the mounting piece and the connecting portion may be cracked or split even though the mounting piece is not likely to detach from the collars.

The invention was completed in view of the above situation and an object thereof is to suppress the detachment of a mounting piece from a vehicle and to improve durability of the connector.

SUMMARY OF THE INVENTION

The invention relates to a vehicle-side connector to be connected to a charging connector in or for charging a battery of a vehicle. The vehicle-side connector has a connecting portion and a mounting piece, each of which is made of synthetic resin. The connecting portion is configured to be connected to the charging connector. The mounting piece is provided integrally or unitarily on the outer surface of the connecting portion. The vehicle-side connector also has at least one collar with a flange that is engageable with the mounting piece in a connecting direction. At least one reinforcement is provided from the mounting piece to the connecting portion.

The flange of the collar engages the mounting piece in the connecting direction to increase a locking force between the collar. Additionally, the reinforcement strengthens the mounting piece and a boundary part between the mounting piece and the connecting portion. Thus, the mounting piece is less likely to detach from the vehicle and the mounting piece and the connecting portion are less likely to break even though the mounting piece is made thinner.

The thinner mounting piece is less likely to have sinks. Thus, the adhesion of a seal to the mounting piece can be improved.

The mounting piece may project from the outer surface of the connecting portion over the entire circumference.

Reinforcements in the form of substantially flat plates may be formed integrally or unitarily to a surface of the mounting piece and the outer surface of the connecting portion at an area of the mounting piece substantially facing the connecting portion. Thus, forces on the boundary between the mounting piece and the connecting portion can be distributed to the surface of the mounting piece facing the connecting portion and the outer surface of the connecting portion and the reinforcements can reinforce around the connecting portion. As a result, the boundary between the mounting piece and the connecting portion is less likely to break.

The mounting piece may include at least one holding portion to be engaged with the flange of the collar. The holding portion may be thick and preferably is provided at an outer peripheral edge portion of the collar.

A force could act on the connecting portion in a direction crossing the proper pulling direction if the charging connector is pulled strongly in a direction crossing a proper pulling direction. This strong pulling force acts on the holding portion engaged with the flange and could pull the collar out of the mounting piece. However, the pulling force is greatest at a part of the mounting piece around the collar that is reinforced.

The holding portion may be integral or unitary with the reinforcement.

A pulling force acts most on the holding portion out of the mounting piece, and thus a part between the holding portion and the connecting portion is more subject to breakage. However, the reinforcing portion is integral or unitary with the holding portion of the invention. Thus, the part between the holding portion and the connecting portion is reinforced reliably.

The flange of the collar may be accommodated in an accommodating groove of the holding portion, and a surface of the accommodating groove and a surface of the flange are engaged in a connecting direction. Thus, the mounting piece is not likely to be detached from the collar by accommodating the flange in the accommodating groove.

Reinforcements may be connect the mounting piece and the connecting portion. The reinforcements may comprise one or more large reinforcements projecting to a space between adjacent collars and one or more small reinforcements projecting toward at least part of the collars.

The large reinforcements may extend to an edge of the mounting piece.

The large reinforcements may project in the lateral and forward directions more than the small reinforcements, which are smaller than the large reinforcements.

These and other objects, features and advantages of the present invention will become more apparent upon reading of the following detailed description of preferred embodiments and accompanying drawings.

DETAILED DESCRIPTION OF THE PREFERRED EMBODIMENTS

Figure 1:
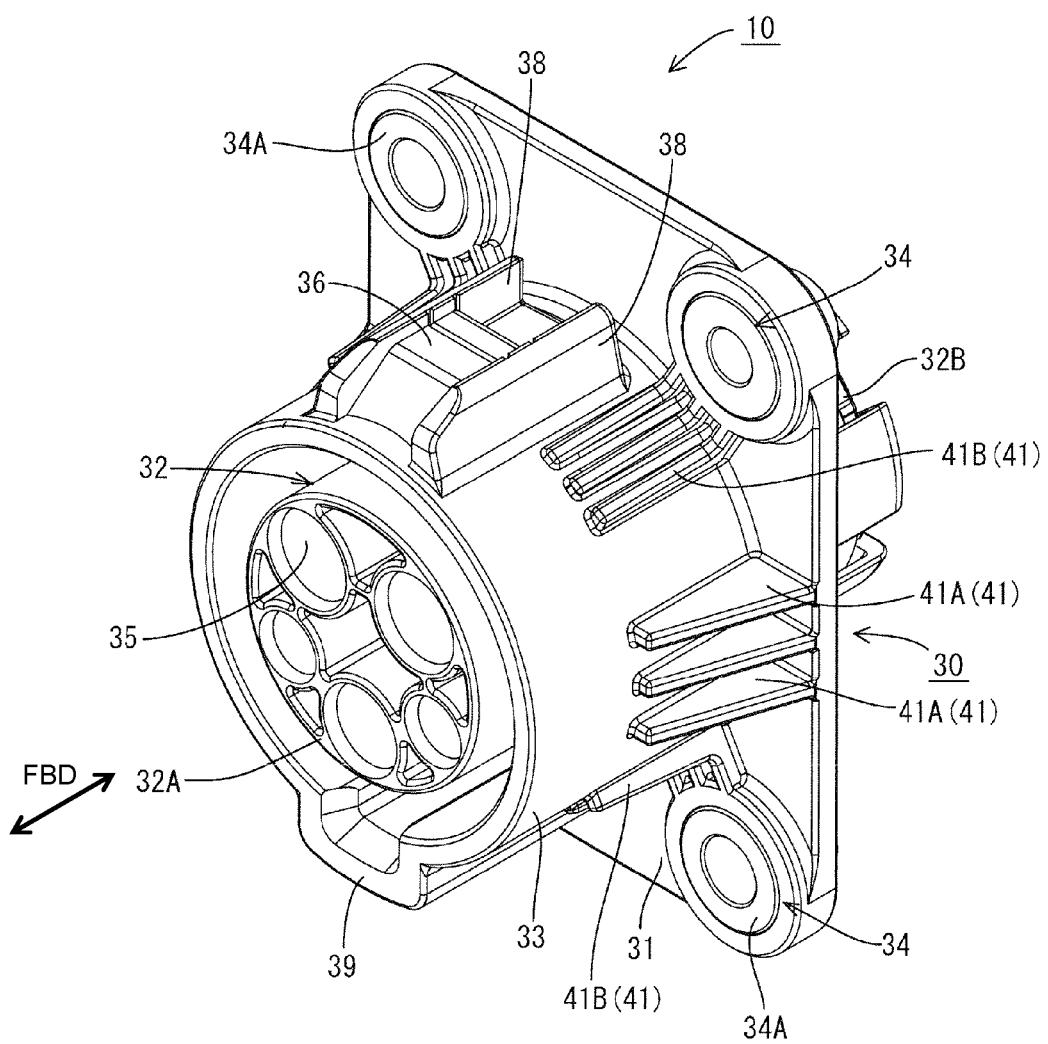
FIG. 1 is a perspective view of a vehicle-side connector.
Figure 2:
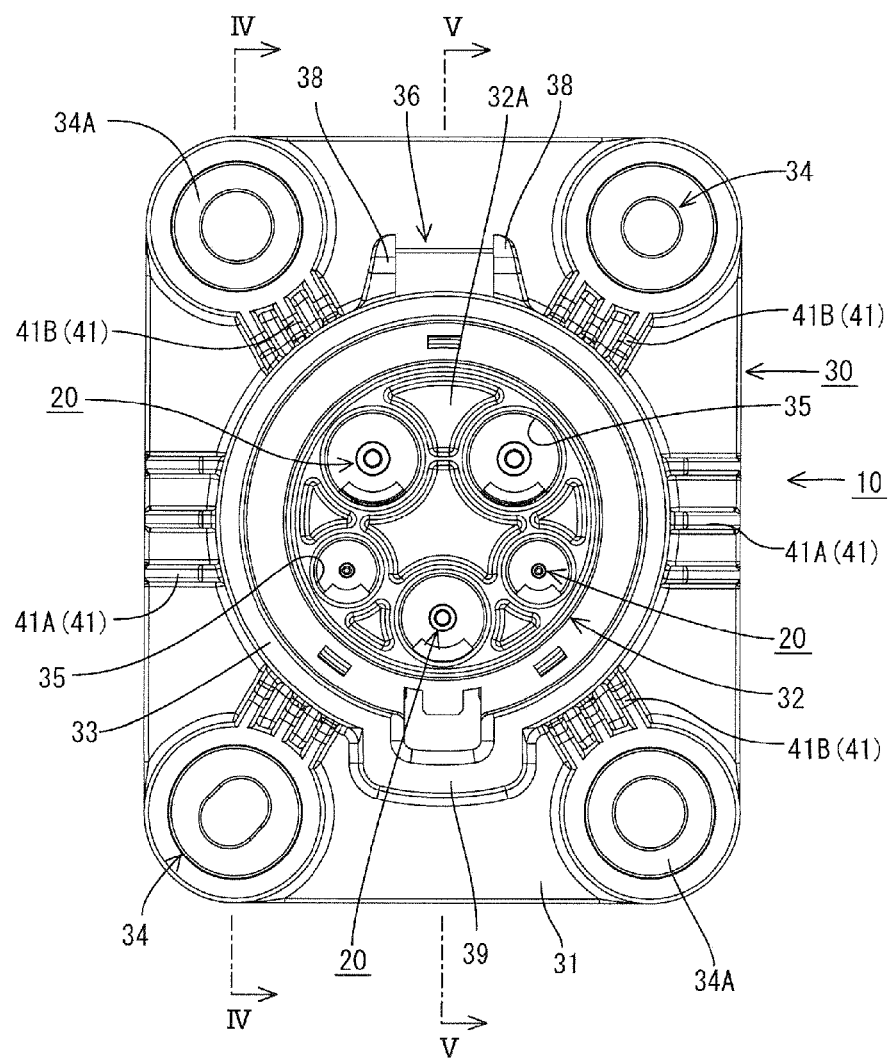
FIG. 2 is a front view of the vehicle-side connector.

A vehicle-side connector 10 of this embodiment is shown in FIGS. 1 and 2, and includes vehicle-side terminal fittings 20 and a housing 30 made e.g. of synthetic resin. The vehicle-side connector 10 is to be fixed to a vehicle B, as shown in FIG. 5, and an unillustrated charging connector is connectable to the housing 30 from the front.

Figure 5:
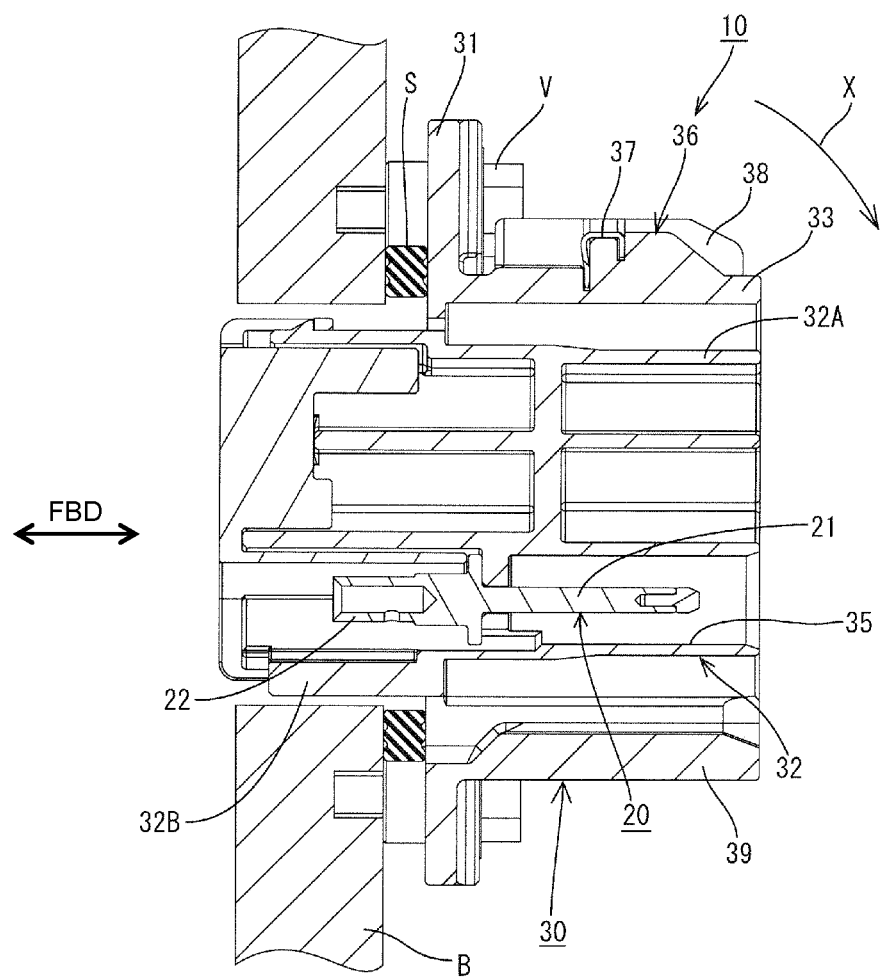
FIG. 5 is a section along V-V of FIG. 2.

Each vehicle-side terminal fitting 20 includes a terminal connecting portion 21 in the form of a round pin and a wire connecting portion 22 to be connected to an unillustrated wire, as shown in FIG. 5. The terminal connecting portion 21 is to be connected electrically conductively to a charging-side terminal fitting in the charging connector when the charging connector is connected to the housing 30.

The housing 30 includes a mounting piece 31 in the form of a substantially rectangular or polygonal flat plate, as shown in FIGS. 1 and 5. A substantially tubular terminal accommodating portion 32 penetrates the mounting piece 31 in forward and backward directions FBD. A substantially tubular connecting portion or receptacle 33 projects unitarily from the mounting piece 31 and is provided around the terminal accommodating portion 32.

Figure 4:
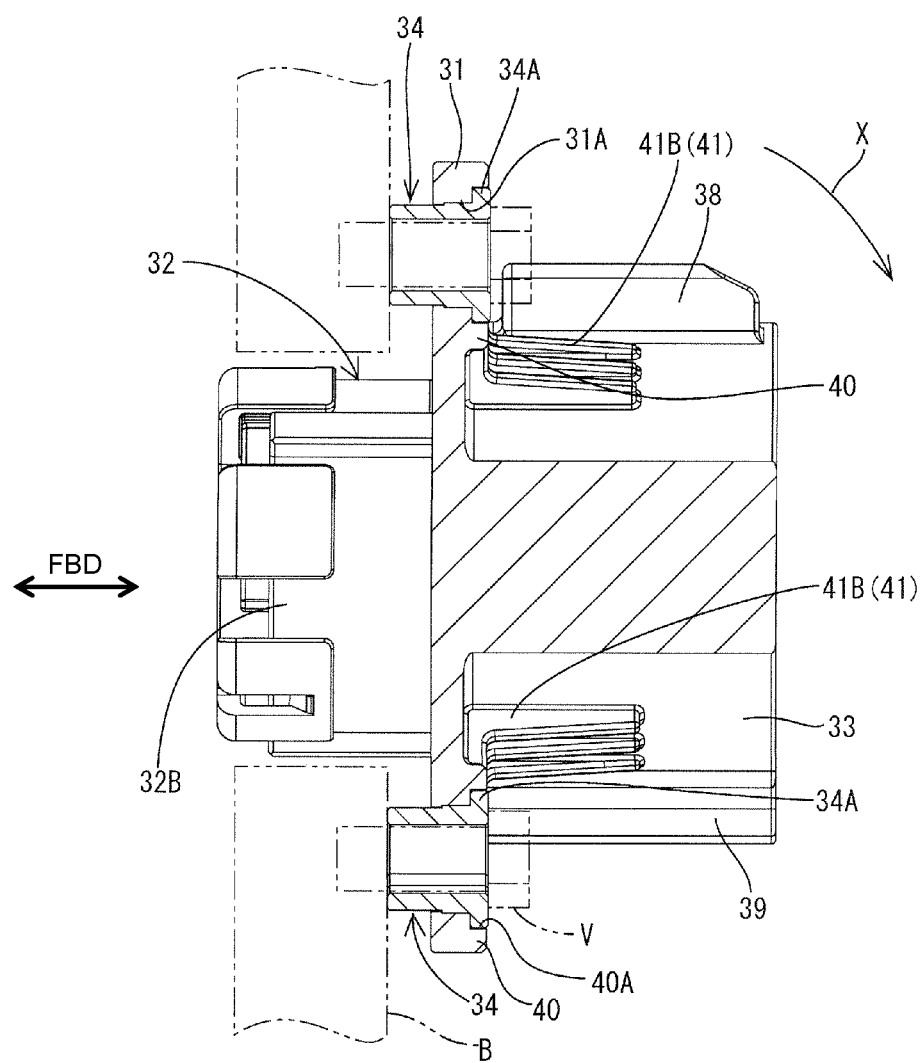
FIG. 4 is a section along IV-IV of FIG. 2.

Collar mounting holes 31A are provided at four corners of the mounting piece 31, as shown in FIG. 4. and collars 34 are press-fit into the mounting holes 31A. Fixing bolts V are inserted into the collars 34 and tightening into the vehicle B, as shown in FIGS. 4 and 5 to fix the housing 30 to the vehicle.

A surface seal S is mounted around the terminal accommodating portion 32 between the vehicle B and the rear surface of the mounting piece 31, as shown in FIG. 5. The seal S closely contacts the vehicle B and the rear surface of the mounting piece 31 to prevent fluid or water from flowing through a clearance between the vehicle B and the mounting piece 31 and entering the vehicle B through a mount hole B1 in the vehicle B.

The terminal accommodating portion 32 includes a forward projecting portion 32A that projects forward from the mounting piece 31 and a backward projecting portion 32B that projects back from the mounting piece 31, as shown in FIG. 5. Cavities 35 penetrate the terminal accommodating portion 32 in forward and backward directions FBD, and the vehicle-side terminal fittings 20 are held in the respective cavities 35.

As shown in FIGS. 1 and 5, the receptacle 33 is arranged around the forward projecting portion 32A of the terminal accommodating portion 32 and extends from a front surface 31A of the mounting piece 31 toward the front end of the forward projecting portion 32A. Thus, the mounting piece 31 projects from the outer peripheral surfaces of the terminal accommodating portion 32 and the receptacle 33 over the substantially entire circumference. A charging-side receptacle of the unillustrated charging connector can fit in a space between the receptacle 33 and the forward projecting portion 32A as the charging connector is fit to the receptacle 33.

A block-shaped lock 36 projects up from the top of the receptacle 33, as shown in FIGS. 1 and 2, and is long in forward and backward directions FBD. A metal locking piece 37 covers a rear part of the lock 36, as shown in FIG. 5. A lock claw (not shown) on the charging connector engages the locking piece 37 of the lock 36 in a pulling direction when the receptacle 33 and the charging-side receptacle are fit together properly to hold the receptacle 33 and the charging-side receptacle in a properly fit state. Protection walls 38, 38 stand up from the upper part of the receptacle 33 adjacent to the lock 36 and face each other on opposite left and right sides of the lock 36, as shown in FIGS. 1 and 2. The protection walls 38, 38 extend back from a position before the lock 36 toward the mounting piece 31 to protect the lock 36 from external interference in a lateral direction.

A radially aligned positioning recess 39 is provided in a lower part of the receptacle 33, as shown in FIGS. 1 and 2. The positioning recess 39 guides the charging-side receptacle to a proper fit position by guiding an unillustrated positioning rib on the charging-side receptacle therein when connecting the charging connector.

As shown in FIG. 4, a flange 34A is formed on the front end of the collar 34 press-fit to the mounting piece 31 and projects out over the entire circumference. On the other hand, a holding portion 40 is formed at the outer periphery of the front end of the collar mounting hole 31A of the mounting piece 31 and projects forward from the front surface of the mounting piece 31. The thickness of the holding portion 40 in forward and backward directions FBD is larger than that of the mounting piece 31 at an outer peripheral edge of the receptacle 33. Further, a substantially circular accommodating groove 40A is formed in the holding portion 40 by recessing the front surface of the holding portion 40 backward. The accommodating groove 40A has a depth substantially equal to the thickness of the flange 34A of the collar 34.

The flange 34A of the collar 34 can be accommodated into the accommodating groove 40A so that the bottom surface (front surface) of the accommodating groove 40A and the rear surface of the flange 34A engage in a connecting direction so that the mounting piece 31 cannot be detached from the collar 34 in a forward direction even if the forward projecting portion 32A and the receptacle 33 are pulled strongly forward or if a force acts on the forward projecting portion 32A and the receptacle 33 in a direction crossing forward and backward directions FBD.

Figure 3:
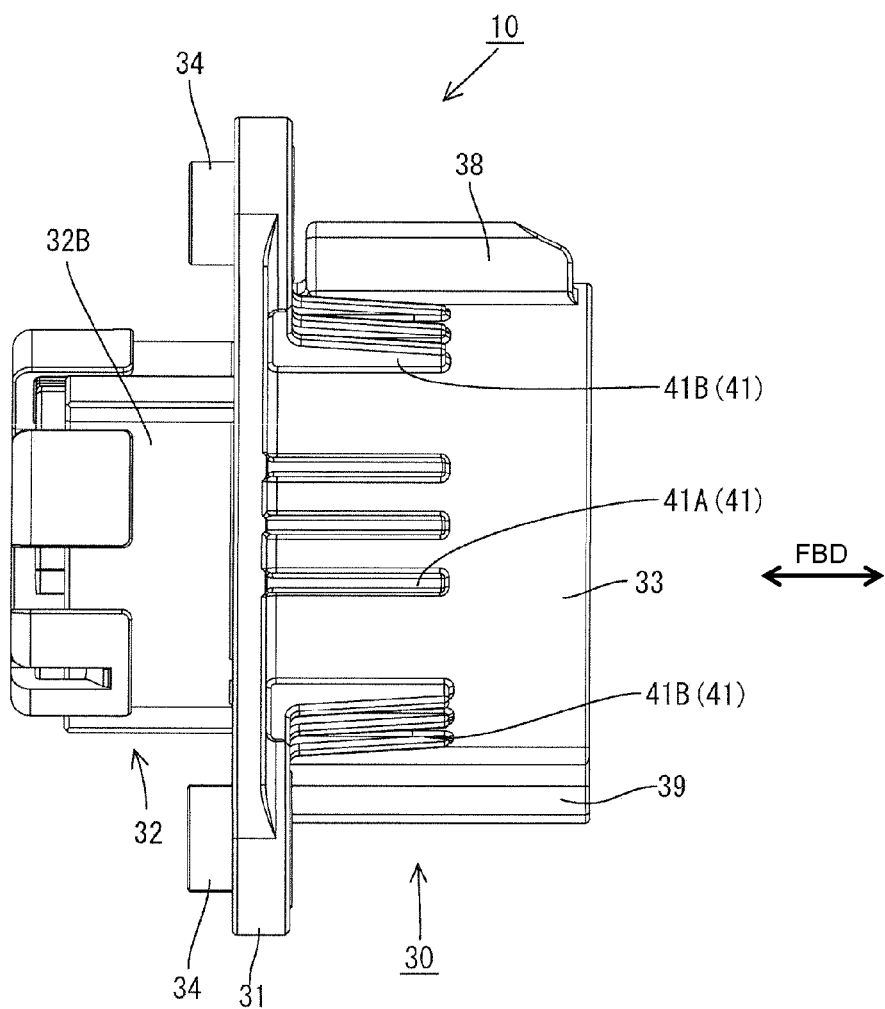
FIG. 3 is a side view of the vehicle-side connector.

Planar reinforcing plates 41 extend unitarily between the front surface of the mounting piece 31 and the outer peripheral surface of the receptacle 33, as shown in FIGS. 1 and 2 and are aligned substantially radially to the outer peripheral surface of the receptacle 33. Specifically, three reinforcing plates 41 are formed at each of six positions, namely on the opposite lateral sides of the receptacle 33, at opposite left and right sides of the lock projection 36 and at opposite left and right sides of the positioning recess 39. As shown in FIGS. 1 and 3, the reinforcing plates 41 on the opposite lateral sides of the receptacle 33 are large reinforcing plates 41A that project in the lateral and forward directions more than the other reinforcing plates 41. The reinforcing plates 41 at the opposite left and right sides of the lock projection 36 and at the opposite left and right sides of the positioning recess 39 are small reinforcing plates 41B that are smaller than the large reinforcing plates 41A.

The large reinforcing plates 41A extend from opposite lateral ends of the mounting piece 31 to an intermediate part of the receptacle 33 in forward and backward directions FBD.

The small reinforcing plates 41B are formed unitarily to the holding portions 40 at the respective corners of the mounting piece 31 and extend substantially straight from the holding portions 40 to an intermediate part of the receptacle 33 in forward and backward directions FBD.

As shown in FIGS. 4 and 5, the vehicle-side connector 10 is bolted to the vehicle B. The unillustrated charging connector is connected from the front for charging and is pulled back from the vehicle-side connector 10 when charging is completed.

The charging connector for the vehicle normally is gun-shaped. Thus, a pulling force may act down in an X direction that crosses a proper pulling direction during an attempt to pull the charging connector. Thus, a strong force will act on the receptacle 33 and the forward projecting portion 32A in the direction X crossing the pulling direction. Accordingly, stress may concentrate on parts of the mounting piece 31 where the collars 34 are press-fit and at a boundary between the mounting piece 31 and the receptacle 33. However, the bottom surfaces of the accommodating grooves 40A of the holding portions 40 in the mounting piece 31 and the rear surfaces of the flanges 34A of the collars 34 are engaged reliably. Thus, the mounting piece 31 cannot detach from the vehicle.

Further, the reinforcing plates 41 reinforce the boundary between the mounting piece 31 and the receptacle 33. Thus, the boundary between the mounting piece 31 and the receptacle 33 will not crack or split. Specifically, the large reinforcing plates 41A withstand lateral forces and distribute lateral forces to the mounting piece 31 and the receptacle 33. Similarly, the small reinforcing plates 41B withstand vertical forces and distribute vertical forces to the mounting piece 31 and the receptacle 33. Thus, the mounting piece 31 and the receptacle 33 are not likely to break even if forces act on the receptacle 33 and the forward projecting portion 32A in the vertical or lateral direction.

The thick holding portions 40 are arranged in parts between the outer peripheral edges of the collars 34 and the outer surface of the receptacle 33 where a pulling force is concentrated most. Additionally, the small reinforcing plates 41B are unitary with the holding portions 40 and are arranged straight. Thus, these parts are reinforced reliably and a pulling force can be distributed efficiently. Accordingly, the mounting piece 31 is less likely to detach and the receptacle 33 is even less likely to break. Further, the mounting piece 31 can be reinforced merely by making peripheral parts of the collars 34 thick without making the entire mounting piece 31 thick.

As described above, according it is possible to suppress the detachment of the mounting piece 31 from the collars 34 and reinforce the receptacle 33 and the mounting piece 31 without making the mounting piece 31 thick. Thus, sinks will not form on the surface of the mounting piece 31 while molding the mounting piece 31. This can improve the adhesion of the surface seal S to the mounting piece 31.

The invention is not limited to the above described embodiment. For example, the following embodiments also are included in the scope of the invention.

The collars 34 are press-fit into the collar mounting holes 31A of the mounting piece 31 to engage the accommodating grooves 40A of the holding portions 40 and the flanges 34A of the collars 34 in the above embodiment. However, a mounting piece may be molded with the collars 34 as inserts and the mounting piece and the flanges 34A of the collars 34 may be engaged in forward and backward directions.

The receptacle 33 has a cylindrical shape in the above embodiment. However, the receptacle can be a rectangular or polygonal tube.

The connecting portion is configured as the receptacle 33 in the above embodiment. However, the receptacle 33 may not be provided and the connecting portion may be configured as the exposed terminal accommodating portion 32.

Although the mounting piece 31 is formed on the outer peripheral surface of the terminal accommodating portion 32 over the entire circumference in the above embodiment, the present invention is not limited to such a mode. For example, mounting pieces may be formed only in parts where the collars 34 are press-fit.

What is claimed is:

1. A vehicle-side connector to be connected to a charging connector for charging a battery of a vehicle, comprising:
   a connecting portion made of synthetic resin and to be connected to the charging connector;
   a mounting piece made of synthetic resin and integral with an outer surface of the connecting portion;
   at least one collar with a flange engaging the mounting piece in a connecting direction; and
   a plurality of reinforcing plates provided from the mounting piece to the connecting portion, the reinforcing plates comprise at least one large reinforcing plate projecting to a space between adjacent collars and small reinforcing plates projecting toward the collars.

2. The vehicle-side connector of claim 1, wherein the mounting piece projects from the outer surface of the connecting portion over an entire circumference of the connecting portion.

3. The vehicle-side connector of claim 2, wherein a plurality of reinforcing plates extend integrally or unitarily from a surface of the mounting piece to the outer surface of the connecting portion.

4. The vehicle-side connector of claim 1, wherein the mounting piece includes at least one holding portion engaged with the flange of the collar.

5. The vehicle-side connector of claim 4, wherein the holding portion is thicker than other parts of the mounting piece and surrounds an outer periphery of the collar.

6. The vehicle-side connector claim 5, wherein the holding portion is integral or unitary with the reinforcing plate.

7. The vehicle-side connector of claim 5, wherein the flange of the collar is accommodated in an accommodating groove of the holding portion so that a surface of the accommodating groove- and a surface of the flange are engaged in a connecting direction for preventing the mounting piece from being detached from the collar.

8. The vehicle-side connector of claim 1, wherein the large reinforcing portions extend to an edge of the mounting piece.

9. The vehicle-side connector of claim 1, wherein the large reinforcing portions project in at least one of lateral and forward directions more than the small reinforcing portions.

10. A vehicle-side connector to be connected to a charging connector for charging a battery of a vehicle, comprising:
    a connecting portion made of synthetic resin, the connecting portion having a front end configured to be connected to the charging connector and a rear end spaced rearward from the front end in forward and backward directions;
    a mounting piece made of synthetic resin and projecting unitarily out from an outer surface of the connecting portion at a position rearward of the front end of the connecting portion, holding portions at positions on the mounting piece outward of the connecting portion, each holding portion including a hole penetrating through the mounting piece and an annular wall surrounding the hole, the annular wall of each of the holding portions being thicker in forward and backward directions than other parts of the mounting piece and projecting forward from adjacent areas of the mounting piece;
    a lock formed on an outer surface of the connecting portion at a position spaced forward of the mounting piece and offset from the holding portions;
    collars mounted respectively in the holes of the holding portions, each of the collars having a flange with a rearward facing surface engaging a forward facing surface at a part of the mounting piece surrounded by the annular wall of the respective holding portion;

a lock formed on an outer surface of the connecting portion at a position spaced forward of the mounting piece and offset from the holding portions; and first reinforcing plates extending unitarily between the connecting portion and the holding portions and being unitary with the mounting piece, second reinforcing plates extending unitarily from the connecting portion to the mounting piece at locations intermediate the holding portions and spaced from the lock.

11. The vehicle-side connector of claim 10, wherein the reinforcing plates are unitary with portions of the mounting piece between the connecting portion and the holding portions.

12. The vehicle-side connector of claim 10, wherein plural reinforcing plates extend between each holding portion- and the connecting portion.

13. A vehicle-side connector to be connected to a charging connector for charging a battery of a vehicle, comprising:

a connecting portion made of synthetic resin, the connecting portion having a front end configured to be connected to the charging connector and a rear end spaced rearward from the front end in forward and backward directions;

a mounting piece made of synthetic resin and projecting unitarily out from an outer surface of the connecting portion at a position rearward of the front end of the connecting portion, holding portions at positions on the mounting piece outward of the connecting portion, each holding portion including a hole penetrating through the mounting piece and an annular wall surrounding the hole, the annular wall of each of the holding portions being thicker in forward and backward directions than other parts of the mounting piece and projecting forward from adjacent areas of the mounting piece;

collars mounted respectively in the holes of the holding portions, each of the collars having a flange with a rearward facing surface engaging a forward facing surface at a part of the mounting piece surrounded by the annular wall of the respective holding portion; and small reinforcing plates extending unitarily between the connecting portion and the holding portions and large reinforcing plates unitary with the mounting piece and the connecting portion at positions spaced from the holding portions, the large reinforcing plates extending to an outer periphery of the mounting piece.

* * * * *